United States Patent Office 3,105,741
Patented Oct. 1, 1963

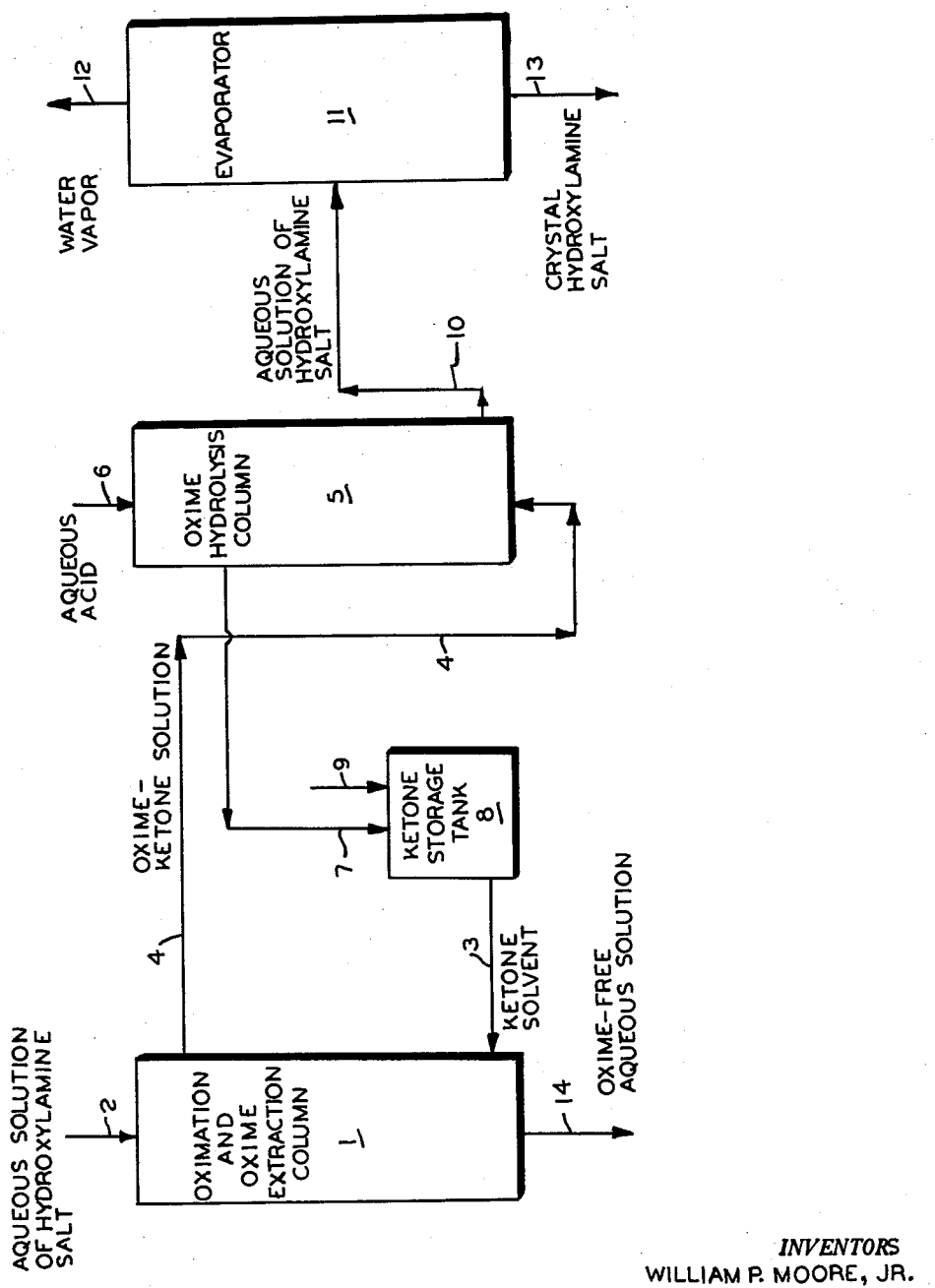

3,105,741
RECOVERY AND PURIFICATION OF
HYDROXYLAMINE
William P. Moore, Jr., Chester, and George A. Elliott, Petersburg, Va., assignors to Allied Chemical Corporation, New York, N.Y., a corporation of New York
Filed Apr. 10, 1961, Ser. No. 102,036
11 Claims. (Cl. 23—190)

This invention relates to a novel process for the recovery and purification of hydroxylamine from impure, aqueous solutions of hydroxylamine sulfonates, particularly hydroxylamine monoammonium sulfonates.

Hydroxylamine sulfonates are commercially produced by the reaction of sulfur dioxide with an aqueous solution containing an inorganic nitrite and bisulfite, e.g., ammonium nitrite and ammonium bisulfite. The reaction mixture thus produced contains a considerable quantity of a hydroxylamine sulfonate plus inorganic sulfates, bisulfates, sulfuric acid, and hydroxylamine sulfate.

It has been proposed to recover pure hydroxylamine from impure hydroxylamine sulfonate solutions by reacting said crude hydroxylamine solutions with sufficient acetone to form the water-soluble acetoxime, and then steam distilling the acetoxime. The acetoxime distillate thus received is hydrolyzed with acid. The aqueous acetone solution thus produced is removed by evaporation leaving the dry, hydroxylamine salt.

This procedure requires the neutralization of the excess acid in the crude hydroxylamine sulfonate solution in order to effect the conversion of hydroxylamine to acetoxime. The necessity of neutralizing the reaction mixture requires the addition of a relatively costly alkali, such as caustic soda and ammonia. Furthermore, the extensive solubility of acetone in water requires that the hydrolysis of the acetoxime distillate be carried out with the complicating feature of continuous removal of the liberated acetone, in order that a high degree of hydrolysis might be obtained.

Accordingly, it is an object of the present invention to provide a process for the isolation of a pure hydroxylamine from an aqueous solution of a hydroxylamine sulfonate, wherein said hydroxylamine sulfonate solution can be first converted to a ketoxime without requiring the neutralization of the reaction mixture.

It is another object of this invention to provide a process for the isolation of pure hydroxylamine from an aqueous solution of a hydroxylamine sulfonate, wherein a ketoxime prepared from said hydroxylamine sulfonate solution can be hydrolyzed in high yield without the aid of concomitant distillation of the liberated ketone.

In accordance with our invention, pure hydroxylamine is obtained from a solution of a hydroxylamine sulfonate by intimately admixing and heating a liquid, water-insoluble, aliphatic, methyl ketone with an aqueous solution containing a hydroxylamine sulfonate to form the corresponding ketoxime, separating the water-insoluble methyl ketone layer containing the ketoxime, hydrolyzing said ketoxime by heating it in the presence of an aqueous, non-oxidizing, mineral acid, and removing the ketone layer from the resulting aqueous hydroxylamine solution.

The process as defined in the present invention provides a two phase, heterogeneous, reaction mixture which permits the ready formation of a ketoxime without the necessity of neutralizing the excess acid in the crude hydroxylamine sulfonate solution as has heretofore been required. Consequently, the oximation reaction can readily occur at a pH of 1 or lower. In addition, the utilization of excess ketone creates a ketone phase in which the ketoxime dissolves. The presence of the ketoxime in this phase permits the easy separation of the ketoxime from the aqueous reaction mixture by decantation rather than by the more cumbersome distillation or filtration operations. Furthermore, the decantation operation of the ketoxime-ketone phase produces an ion-free solution of the ketoxime. An ion-free solution such as this permits a more facile hydrolysis of the ketoxime than would be obtained if the hydrolysis reaction mixture contained inorganic salts. In addition, the hydrolysis of the ketoxime is further facilitated by the insolubility of the liberated ketone in the aqueous phase. The ketone thus produced during the hydrolysis is readily separated by simple decantation, and can then be used for the production of more ketoxime. This is a considerable improvement over processes utilizing water-soluble ketones, wherein it is necessary to resort to distillation to remove the ketone from the hydrolysis mixture, so that high yields of hydroxylamine salt may be obtained.

The ketones used in our process are liquid, aliphatic methyl ketones of the formula

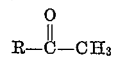

wherein R is a saturated or unsaturated hydrocarbon radical of such dimensions that said ketone is insoluble in water. Preferred ketones for this process are 2-octanone and 2-heptanone.

The hydroxylamine sulfonate starting material has the general formula

HONHSO$_3$M wherein M is a cation selected from the group consisting of ammonium, the alkali metals and hydrogen. Hydroxylamine sulfonate solutions containing from 3 to 30 percent by weight of hydroxylamine sulfonate are generally desirable for the oximation operation of the purification process. Optimum results are obtained, however, with those solutions containing about 12 to about 20 percent by weight of hydroxylamine sulfonate.

Ketoxime formation is an equilibrium reaction under the conditions which are employed herein. Equilibrium is established at about 45–50 percent conversion to the ketoxime. Consequently, batch operation requires three or more reaction stages for nearly complete reaction of the hydroxylamine with the ketone. Continuous operation is preferred, however, because essentially quantitative conversion of hydroxylamine to the ketoxime may be obtained by the operation of a simple counter-current column. Sufficient ketone is introduced into the reaction mixture so that the proportion of ketone to hydroxylamine monoammonium sulfonate is within the range from about 1:1 to about 3:1 by weight.

Intimate contact between the aqueous phase and the ketone-ketoxime phase is necessary to establish equilibrium in minimum time. Although a reaction temperature from 30 to 150° C. is applicable for the oxime formation, the reaction is preferably carried out at temperatures from 80° C. to 100° C. The oxime equilibrium is generally established in one hour at temperatures of 85–90° C. Higher reaction temperatures than 100° C. shorten the time needed to reach equilibrium even more, but reactions carried out under these elevated temperatures are complicated by the requirement of pressure equipment because of the increased vapor pressure of the water.

Any non-oxidizing, strong, mineral acid may be used for hydrolysis of the ketoxime. Such mineral acids as sulfuric or hydrochloric may be used for this purpose. Acids such as these are preferably used as relatively dilute, aqueous solutions in which the acid concentration is about 10 to 30 percent by weight. The hydrolysis mixture should have a pH of 1 or less for efficient hydrolysis. Preferred hydrolysis temperatures are within the range from 80° to 100° C., although temperatures as low as 30° C. and as high as 150° C. are applicable. Temperatures in excess of 100° C. require the use of superatmospheric pressures.

The apparatus used for the continuous recovery and purification of hydroxylamine is illustrated in FIGURE 1. Rectangular areas 1, 5, 8 and 11 represent the oxime extractor column, the oxime hydrolysis column, the ketone storage tank, and the hydroxylamine salt evaporator, respectively. The remaining numbered, arrowed lines indicate the pipelines through which the process materials are transported.

The following specific examples will further illustrate the invention. Parts are by weight, and temperatures are in degrees centigrade.

EXAMPLE 1

Continuous Operation

The continuous process may be described with reference to the drawing.

An aqueous solution containing hydroxylamine monoammonium sulfonate (16.8 parts), ammonium bisulfate (17.0 parts), sulfuric acid (1.5 parts), and water (65.0 parts) was continuously fed to the top of the oxime extractor column 1, a conventional packed column, through line 2. Into the bottom of this column, 2-octanone (33.1 parts) was fed through line 3. The temperature of the resulting mixture was maintained at 80–100° by heating with a steam coil. The hydroxylamine monoammonium sulfonate solution passed downward through the column reacting with the 2-octanone which was passing upwards. With countercurrent flow, the ketone-ketoxime layer overflowing at the top of the reactor was in equilibrium with the hydroxylamine-rich solution entering through line 2. Conversely, the aqueous effluent at the bottom of the column was essentially stripped of hydroxylamine salt and was discharged via line 14. This effluent now contained primarily ammonium bisulfate, sulfuric acid, and water. Total retention time in the extractor was about 3 hours.

The ketoxime-ketone layer, containing 2-octanone (16.56 parts) and 2-octanone oxime (18.48 parts) overflowed from the extractor column through line 4, and entered the bottom of the hydrolysis column 5. A solution consisting of sulfuric acid (6.33 parts) in water (17.92 parts) was fed to the top of the hydrolysis column through line 6, and passed downward through the column countercurrent to the rising ketone-ketoxime solution. The temperature was maintained at 80° to 100° C. by a steam coil. The ketoxime was hydrolyzed by the sulfuric acid solution to form hydroxylamine sulfate and 2-octanone. The pH of the hydrolysis mixture was less than 1.

Approximately 33.1 parts of oxime-free 2-octanone overflowed through line 7 from the top of the reactor to the ketone storage tank 8 for recycle to the oxime extractor column 1 via line 3. Additional 2-octanone was added to the ketone storage tank 8, as needed, through line 9.

Aqueous hydroxylamine sulfate solution was discharged from the bottom of the oxime hydrolysis column 5 through line 10, and entered the hydroxylamine salt evaporator 11. This solution, which consisted of hydroxylamine sulfate (10.59 parts) and water (15.6 parts), was concentrated by evaporation of the solvent through line 12. The crystallized hydroxylamine sulfate (10.59 parts) was discharged through line 13 and collected.

EXAMPLE 2

Batch Operation

A water-jacketed, stirred pot reactor containing 239 parts of aqueous hydroxylamine monoammonium sulfonate solution which consisted of hydroxylamine sulfate (17.6 parts), hydroxylamine monoammonium sulfonate (14.6 parts), ammonium bisulfate (41.4 parts), and ammonium sulfate (6.12 parts), was charged with 2-heptanone (51.4 parts). The reactants were heated, and maintained at 80–90° for 4.5 hours with agitation. The layers were separated and the heptanone phase was washed with 60 parts of water. The aqueous layer including the washings amounted to 291.6 parts (pH 0.25). The oil layer was 51.5 parts. The aqueous layer was separated by decantation from the 2-heptanone phase which was found to contain 21.4 parts of 2-heptanone oxime. The oximation process was repeated twice as follows:

The stirred pot reactor was recharged with 264.1 parts of the remaining aqueous layer and 50.0 parts of 2-heptanone. It was heated again to 80–90° with agitation for 2 hours. The immiscible layers were separated and the heptanone layer was washed with 40 parts of water. The aqueous layer consisted of 297.7 parts, including the washings, and had a pH of 0.25. Analysis of the 2-heptanone layer (50.8 parts) indicated the presence of 2-heptanone (37.4 parts) and 2-heptanone oxime (9.4 parts).

The stirred pot reactor was recharged a final time with 272.7 parts of the remaining aqueous layer and 50.0 parts of 2-heptanone. The reactants were again maintained at 80–90° for 2 hours with agitation. The immiscible layers were again separated and the 2-heptanone layer was washed with 40 parts of water. The aqueous layer including the washings was 309.4 parts and had a pH of 0.29. Analysis of the 2-heptanone layer (49.8 parts) indicated that it consisted of 2-heptanone (42.4 parts) and 2-heptanone oxime (4.4 parts). Total conversion in the three stage reaction was 84.8 percent based on the initial hydroxylamine salts.

To accomplish hydrolysis of the 2-heptanone oxime, the stirred pot reactor was charged with the combined 2-heptanone oxime-heptanone layers and 11.0 percent aqueous sulfuric acid (266.8 parts). The reactants were maintained at 86–94° for one hour and agitated. The 2-heptanone layer was separated by decantation, and the remaining aqueous layer (320 parts, pH 0.18) was evaporated to dryness and found to contain 35.9 parts of hydroxylamine sulfate, or 81.1 percent yield based on the oxime charged to the reactor.

EXAMPLE 3

Batch Operation

A jacketed, stirred pot reactor was charged with 239 parts of aqueous hydroxylamine monoammonium sulfonate solution containing said sulfonate (14.6 parts), hydroxylamine sulfate (17.6 parts), ammonium bisulfate (41.4 parts), and ammonium sulfate (6.12 parts). To this was added 2-octanone (57.6 parts), and the reaction mixture was agitated at 85–92° for one hour. The immiscible layers were separated by decantation, and the 2-octanone layer was washed with water (60 parts), and again decanted. The aqueous layer, including the washings, amounted to 294.6 parts (pH 0.18). Distillation of the recovered 2-octanone layer yielded 2-octanone oxime (21.3 parts).

The reactor was charged with 11.0 percent aqueous sulfuric acid (266.8 parts), and 2-octanone oxime (21.3 parts) was added. The reactants were agitated at 84–93° for one hour, the immiscible layers were separated by decantation, and the recovered 2-octanone ketoxime layer was washed with water (50 parts). Analysis of the aqueous layer including the washings indicated the presence of 11.1 parts of hydroxylamine sulfate. The aqueous layer including the washings totaled 313.8 parts. The quantity of hydroxylamine sulfate which was obtained corresponds to a 90.9 percent yield based on the oxime charged to the hydrolysis reaction mixture.

While the above describes the preferred embodiments of the invention, it will be understood that departures can be made therefrom within the scope of the specification and claims.

We claim:
1. A process for the recovery and purification of hy- droxylamine from an aqueous solution containing a hydroxylamine sulfonate which comprises reacting a liquid, water-insoluble, aliphatic methyl ketone with an aqueous solution containing a hydroxylamine sulfonate to form the corresponding ketoxime; separating the water-insoluble, methyl ketone layer containing said ketoxime; hydrolyzing said separated ketoxime by heating it in the presence of an aqueous strong, non-oxidizing, mineral acid; and removing the ketone layer from the resulting aqueous, hydroxylamine solution.

2. A process as defined in claim 1, wherein the hydroxylamine sulfonate has the formula

HONHSO₃M in which M is selected from the group consisting of ammonium, the alkali metals and hydrogen.

3. A process as defined in claim 1, wherein the methyl ketone is selected from the group consisting of 2-heptanone and 2-octanone.

4. A process as defined in claim 1, wherein the non-oxidizing, mineral acid employed for the hydrolysis operation is selected from the group consisting of hydrochloric and sulfuric acids.

5. A process as defined in claim 1, wherein the oximation operation is conducted at a temperature from about 30° C. to about 150° C.

6. A process as defined in claim 5, wherein the admixing step is effected by continuous, countercurrent contact.

7. A process as defined in claim 6, wherein the proportion of methyl ketone to hydroxylamine sulfonate is from about 3:1 to about 1:1 by weight.

8. A continuous process for the recovery and purification of hydroxylamine from an aqueous solution containing hydroxylamine monoammonium sulfonate which comprises countercurrently and intimately admixing at a temperature in the range between about 80° C. and about 100° C., a liquid, water-insoluble, aliphatic methyl ketone with an aqueous solution containing about 3 to about 30 percent by weight hydroxylamine monoammonium sulfonate to form the corresponding ketoxime; separating the water-insoluble, aliphatic methyl ketone layer containing said ketoxime; hydrolyzing said separated ketoxime by heating it in the range between about 80° C. and about 100° C. in the presence of at least sufficient aqueous strong, non-oxidizing, mineral acid to maintain the pH of the hydrolysis mixture at about one; and removing the ketone layer from the resulting aqueous hydroxylamine solution.

9. A process as defined in claim 8, wherein the proportion of said ketone to said hydroxylamine monoammonium sulfonate is from about 3:1 to about 1:1 by weight.

10. A process as defined in claim 8, wherein the methyl ketone is selected from the group consisting of 2-heptanone and 2-octanone.

11. A process as defined in claim 8, wherein non-oxidizing, mineral acid employed for the hydrolysis operation is selected from the group consisting of hydrochloric and sulfuric acids.

References Cited in the file of this patent
UNITED STATES PATENTS
2,414,142    Dreyfus _____ Jan. 14, 1947